(12) United States Patent
Kurihara et al.

(10) Patent No.: US 11,923,555 B2
(45) Date of Patent: Mar. 5, 2024

(54) BATTERY PACK

(71) Applicant: SANYO Electric Co., Ltd., Osaka (JP)

(72) Inventors: Hidemi Kurihara, Osaka (JP); Takao Takatsu, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 500 days.

(21) Appl. No.: 17/048,172

(22) PCT Filed: Apr. 10, 2019

(86) PCT No.: PCT/JP2019/015580
§ 371 (c)(1),
(2) Date: Oct. 16, 2020

(87) PCT Pub. No.: WO2019/208217
PCT Pub. Date: Oct. 31, 2019

(65) Prior Publication Data
US 2021/0167456 A1    Jun. 3, 2021

(30) Foreign Application Priority Data

Apr. 25, 2018   (JP) ................................. 2018-084553

(51) Int. Cl.
*H01M 50/231* (2021.01)
*H01M 10/613* (2014.01)
(Continued)

(52) U.S. Cl.
CPC ....... *H01M 50/231* (2021.01); *H01M 10/613* (2015.04); *H01M 10/623* (2015.04);
(Continued)

(58) Field of Classification Search
None
See application file for complete search history.

(56) References Cited

U.S. PATENT DOCUMENTS

2006/0159984 A1* 7/2006 Nagayama ........ H01M 10/6566
429/61
2008/0220320 A1   9/2008 Horikoshi et al.
(Continued)

FOREIGN PATENT DOCUMENTS

| DE | 102013219666 A1 * | 4/2015 | ........ H01M 10/6554 |
| JP | 2008-218210 | 9/2008 | |
| JP | 2009021223 A * | 1/2009 | ........ H01M 10/0431 |

OTHER PUBLICATIONS

Machine Translation of DE-102013219666-A1 (Year: 2015).*
(Continued)

*Primary Examiner* — Gregg Cantelmo
(74) *Attorney, Agent, or Firm* — WHDA, LLP (57) ABSTRACT

A battery pack includes a plurality of battery cells and holder that has battery cells arranged in a parallel posture. Holder has partition wall between adjacent battery cells for arranging battery cells at fixed positions. Partition wall has a surface facing battery cells as resin molded layer shaped to arrange battery cells at the fixed positions. Partition wall has a three-layer structure where thermally insulating plate is disposed inside and resin molded layer is laminated on both surfaces of thermally insulating plate. Holder is formed in a single-piece structure by molding resin molded layer from a synthetic resin.

18 Claims, 6 Drawing Sheets

(51) Int. Cl.
- *H01M 10/623* (2014.01)
- *H01M 10/643* (2014.01)
- *H01M 10/653* (2014.01)
- *H01M 10/6555* (2014.01)
- *H01M 10/658* (2014.01)
- *H01M 50/213* (2021.01)
- *H01M 50/222* (2021.01)
- *H01M 50/227* (2021.01)
- *H01M 50/247* (2021.01)
- *H01M 50/293* (2021.01)

(52) U.S. Cl.
CPC ....... *H01M 10/643* (2015.04); *H01M 10/653* (2015.04); *H01M 10/6555* (2015.04); *H01M 10/658* (2015.04); *H01M 50/213* (2021.01); *H01M 50/222* (2021.01); *H01M 50/227* (2021.01); *H01M 50/247* (2021.01); *H01M 50/293* (2021.01); *H01M 2220/30* (2013.01)

(56) References Cited

U.S. PATENT DOCUMENTS

| | | | | |
|---|---|---|---|---|
| 2009/0286143 | A1* | 11/2009 | Matthias | H01M 10/486 429/90 |
| 2011/0293986 | A1* | 12/2011 | Kozu | H01M 10/6563 429/120 |

OTHER PUBLICATIONS

Machine Translation of JP-2009021223-A (Year: 2009).*
International Search Report of PCT application No. PCT/JP2019/015580 dated Jul. 9, 2019.

* cited by examiner

BATTERY PACK

CROSS-REFERENCE TO RELATED APPLICATIONS

This application is a U.S. national stage application of the PCT International Application No. PCT/JP2019/015580 filed on Apr. 10, 2019, which claims the benefit of foreign priority of Japanese patent application No. 2018-084553 filed on Apr. 25, 2018, the contents all of which are incorporated herein by reference.

TECHNICAL FIELD

The present invention relates to a battery pack in which a plurality of battery cells is connected in series or in parallel to increase the capacity.

BACKGROUND ART

A battery pack having a plurality of battery cells housed in a case is used as a power source for portable devices and cordless devices. In this battery pack, a plurality of battery cells is connected in series or in parallel to increase the capacity. In particular, in recent years, battery packs are required to increase in capacity and also decrease in size and weight from the viewpoint of portability. Therefore, each battery cell has been increased in capacity, and there is employed a configuration of a battery pack in which the battery cells are arranged without a gap therein.

On the other hand, the battery cells may exhibit thermal runaway due to various causes such as internal short circuit and overcharge. If any one of a plurality of arranged battery cells overheats and ignites, adjacent battery cells may be heated and induce thermal runaway, which propagates and causes thermal runaway of many of the battery cells in some cases. Therefore, it is required that even if any one of the battery cells produces abnormal heat, it does not affect the other battery cells.

In addition, a plastic holder is used for the battery pack to arrange the battery cells in place. This holder is formed into a structure in which each battery cell is guided and arranged in a fixed position. This holder allows the battery cells to be arranged at fixed positions, but would melt under the temperature of a battery cell that might have generated abnormal heat. Due to the melting, the holder may no longer partition the battery cells adjacent to the battery cell that has generated abnormal heat but cause these battery cells to burn from the heat. There has been developed a battery pack in which a mica plate is disposed between adjacent battery cells to insulate heat.

CITATION LIST

Patent Literature

PTL 1: Unexamined Japanese Patent Publication No. 2008-218210

SUMMARY OF THE INVENTION

The mica plate disposed between the battery cells can thermally insulate the battery cells from each other unless the holder does not melt. However, once the holder gets melted due to abnormal heat generation by any one of the battery cells, the mica plate cannot prevent burning of the battery cells.

The present invention was developed to eliminate the above drawback. An object thereof is to provide a battery pack that can avoid induction of thermal runaway while using a plurality of battery cells.

The battery pack of the present invention includes a plurality of battery cells 1 and holder 2 that has battery cells 1 arranged in a parallel posture. Holder 2 has partition wall 23 between adjacent battery cells 1 for arranging battery cells 1 at fixed positions. Partition wall 23 has a surface facing battery cells 1 as resin molded layer 12 shaped to arrange battery cells 1 at the fixed positions. Partition wall 23 has a three-layer structure that thermally insulating plate 13 is disposed inside and resin molded layer 12 is laminated on both surfaces of thermally insulating plate 13. Holder 2 is formed in a single-piece structure by molding resin molded layer 12 from a synthetic resin.

The above battery pack is characterized in that the holder and the thermally insulating plate can avoid induction of thermal runaway of the battery cells while arranging the plurality of battery cells at fixed positions in the holder. In particular, the above battery pack has a feature that the holder can effectively prevent induction of thermal runaway while the holder for arranging the plurality of battery cells at fixed position can be mass-produced inexpensively as a single-piece plastic structure. The above feature can be achieved because the partition wall is provided between the battery cells, the partition wall has a three-layer structure of the resin molded layers and the thermally insulating plate, the surface facing the battery cell has the plastic resin molded layer shaped to arrange the battery cell at the fixed position, and the thermally insulating plate is disposed inside the resin molded layer. In the partition wall of the three-layer structure in which the resin molded layers are laminated on both sides of the thermally insulating plate, the plastic of the resin molded layer in contact with the battery pack having generated abnormal heat would melt but the plastic of the resin molded layer on the opposite side would not melt in the presence of the thermally insulating plate. The thermally insulating plate and the thermally insulating resin molded layer remain as a partition wall of a two-layer structure, and this partition wall prevents burning of the adjacent battery cells. When any of the battery cells generates abnormal heat, the resin molded layer laminated on one surface of the thermally insulating plate will thermally melt with the battery cell having generated abnormal heat and absorbs the heat of melting, but the resin molded layer laminated on the other surface will not thermally melt due to protection by the thermally insulating plate. Thus, the thermally insulating plate and the resin molded layer on the one surface protect the adjacent battery cells, thereby preventing induction of thermal runaway.

In the battery pack of the present invention, battery cells 1 are cylindrical batteries, and holder 2 comprises plastic, and the plastic has insertion gap 25 for disposing thermally insulating plate 13 at a fixed position inside resin molded layer 12. The plastic has the surface facing corresponding battery cell 1, the surface being curved along surface of the corresponding battery cell 1 and allows thermally insulating plate 13 to be disposed into insertion gap 25.

In this battery pack, the insertion gap is provided in the process of molding the holder from plastic so that the thermally insulating plate can be inserted into the insertion gap and placed at a fixed position after molding. Thus, the battery pack can be easily assembled by disposing the thermally insulating plate at the correct position without a positional shift in the holder and also arranging the cylindrical batteries at the fixed positions by the resin molded layer. Since the surfaces of the holder facing the battery cells on the resin molded layer are curved along the cylindrical batteries, the thermally insulating plate can be disposed inside to make the resin molded layer thick so that it is possible to efficiently absorb heat energy of the battery cell having generated abnormal heat by the melting heat of the thick resin molded layer and to prevent induction of thermal runaway of the battery cells particularly in an efficient manner.

In the battery pack of the present invention, thermally insulating plate 13 can be an inorganic plate. In this battery pack, the thermally insulating plate is the inorganic plate to improve the heat resistance of the thermally insulating plate and securely block abnormal heat generated by any of the battery cells.

Thus, the battery pack can reliably prevent induction of thermal runaway of the battery cells without becoming deformed even if it is heated at a high temperature.

In the battery pack of the present invention, thermally insulating plate 13 can be a mica plate. This battery pack can reliably prevent induction of thermal runaway of the battery cells with the thermally insulating plate as a plate material that is inexpensive and has excellent heat insulating properties.

In the battery pack of the present invention, holder 2 can have holding tube 22 in which battery cell 1 is disposed, and can include inflow spaces 24 and 27 outside holding tube 22 into which a heat-melted portion of holding tube 22 is to flow.

The above battery pack can cool the plastic of the resin molded layer melted with the battery cell having generated abnormal heat by flowing into the inflow spaces. Further, the above battery pack can prevent induction of thermal runaway of the battery cells in a more effective manner by flowing the melted resin molded layer into the inflow spaces to provide an air layer between the battery cell and the thermally insulating plate for heat insulating.

In the battery pack of the present invention, holder 2 can have holding tubes 22 arranged in multiple stages and multiple rows, include cross-shaped partition wall 23 provided between holding tubes 22 arranged vertically and horizontally, and include inflow space 24 extending in the longitudinal direction of battery cell 1 in a central portion of cross-shaped partition wall 23.

In the above battery pack, the inner volume of the inflow space provided in the central portion of the holder is large, and the melted resin molded layer can be efficiently flowed into the inflow space, and it is possible to prevent induction of thermal runaway of the battery cells more effectively.

In the battery pack of the present invention, holder 2 can include insertion gap 25 having inflow space 27 in partition wall 23 between adjacent holding tubes 22, insertion gap 25 can include holding gap 26 for disposing thermally insulating plate 13 at a fixed position with a central portion sandwiched in holding gap 26, and the inflow space, a lateral width of holding gap 26 can be narrower than a lateral width of thermally insulating plate 13, and inflow space 27 can be provided on both side portions of thermally insulating plate 13.

In the above battery pack, since the inflow space is provided on both sides of the holding gap of the thermally insulating plate, the melted resin molded layer of the holding tube can efficiently flow into the inflow spaces, so that it is possible to further effectively prevent induction of thermal runaway of the battery cells.

In the battery pack of the present invention, thermally insulating plate 13 can be disposed so as to be freely placed into and taken out of the insertion gap 25.

DESCRIPTION OF EMBODIMENT

Hereinafter, the present invention will be described in detail with reference to the drawings. In the following description, terms to denote specific directions or positions (e.g., "top", "bottom", and other terms including those terms) are used as necessary for easy understanding of the invention with reference to the drawings, and the technical scope of the present invention is not limited by the meanings of the terms. The parts having the same reference numerals appearing in a plurality of drawings indicate the same or equivalent parts or members.

The exemplary embodiment described below is specific examples of the technical idea of the present invention, and the present invention is not limited to the following exemplary embodiment. The dimensions, materials, shapes, relative arrangements, and the like of the components described below are not intended to limit the scope of the present invention thereto but are intended for exemplification, unless specifically stated. The contents described in relation to one exemplary embodiment and example can be applied to other exemplary embodiments and examples. The sizes and positional relationships of members shown in the drawings may be exaggerated in order to clarify the explanation.

Figure 1:
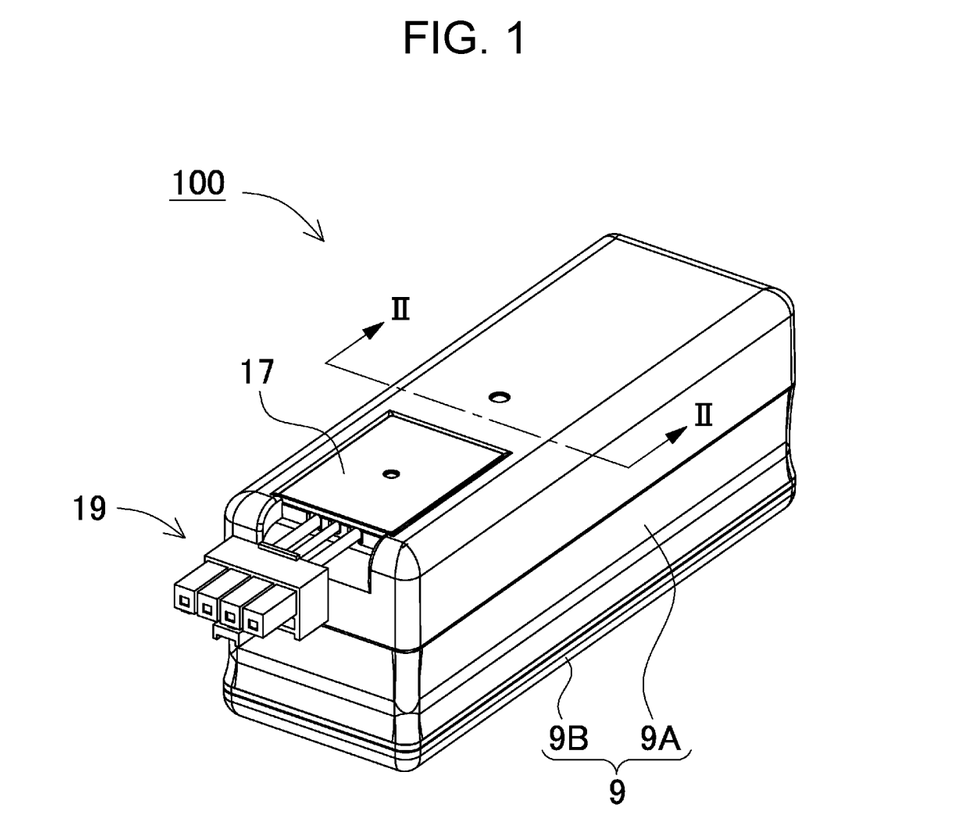
FIG. 1 is a perspective view of a battery pack according to an exemplary embodiment of the present invention.
Figure 2:
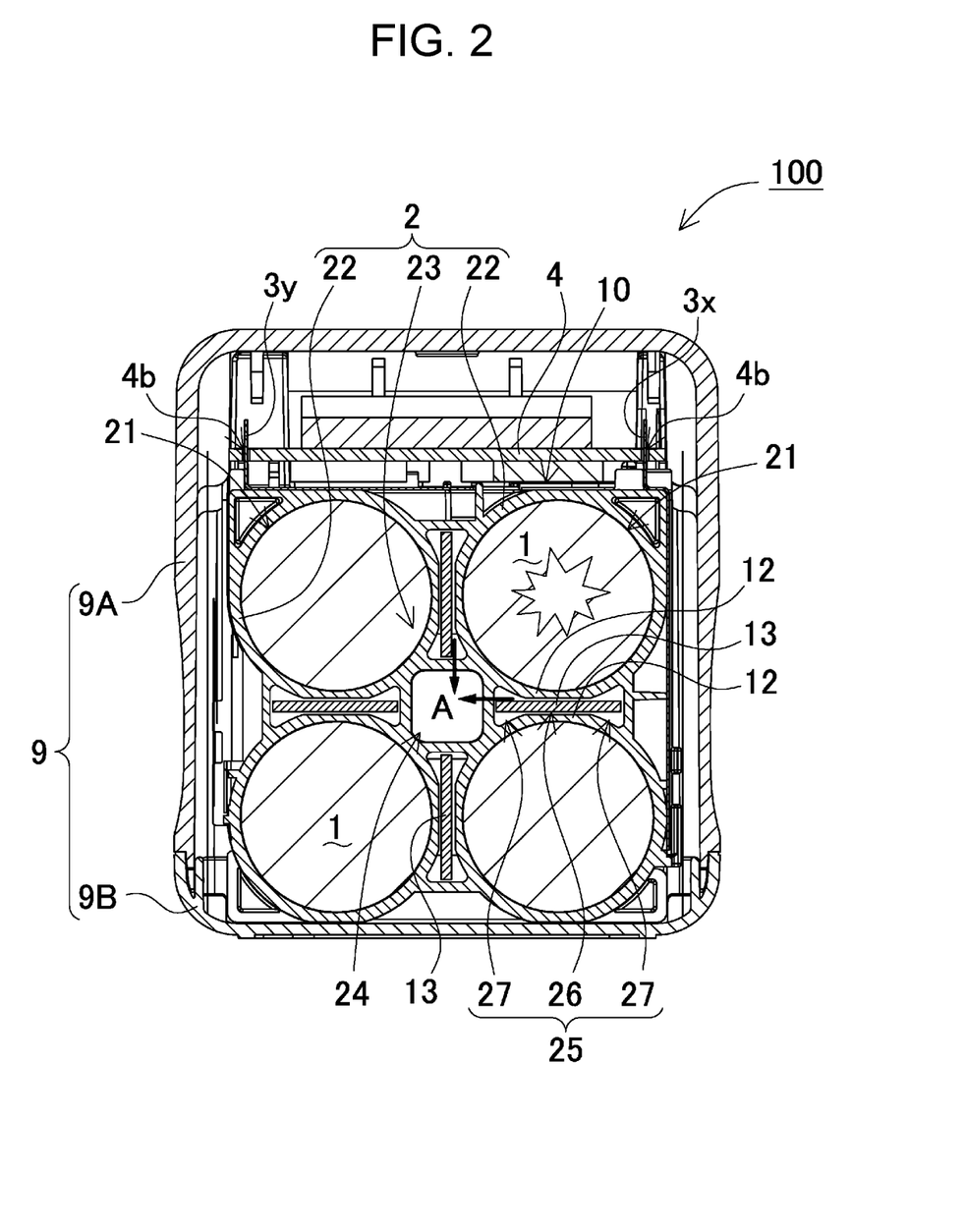
FIG. 2 is a cross-sectional view of the battery pack shown in FIG. 1 taken along line II-II.
Figure 3:
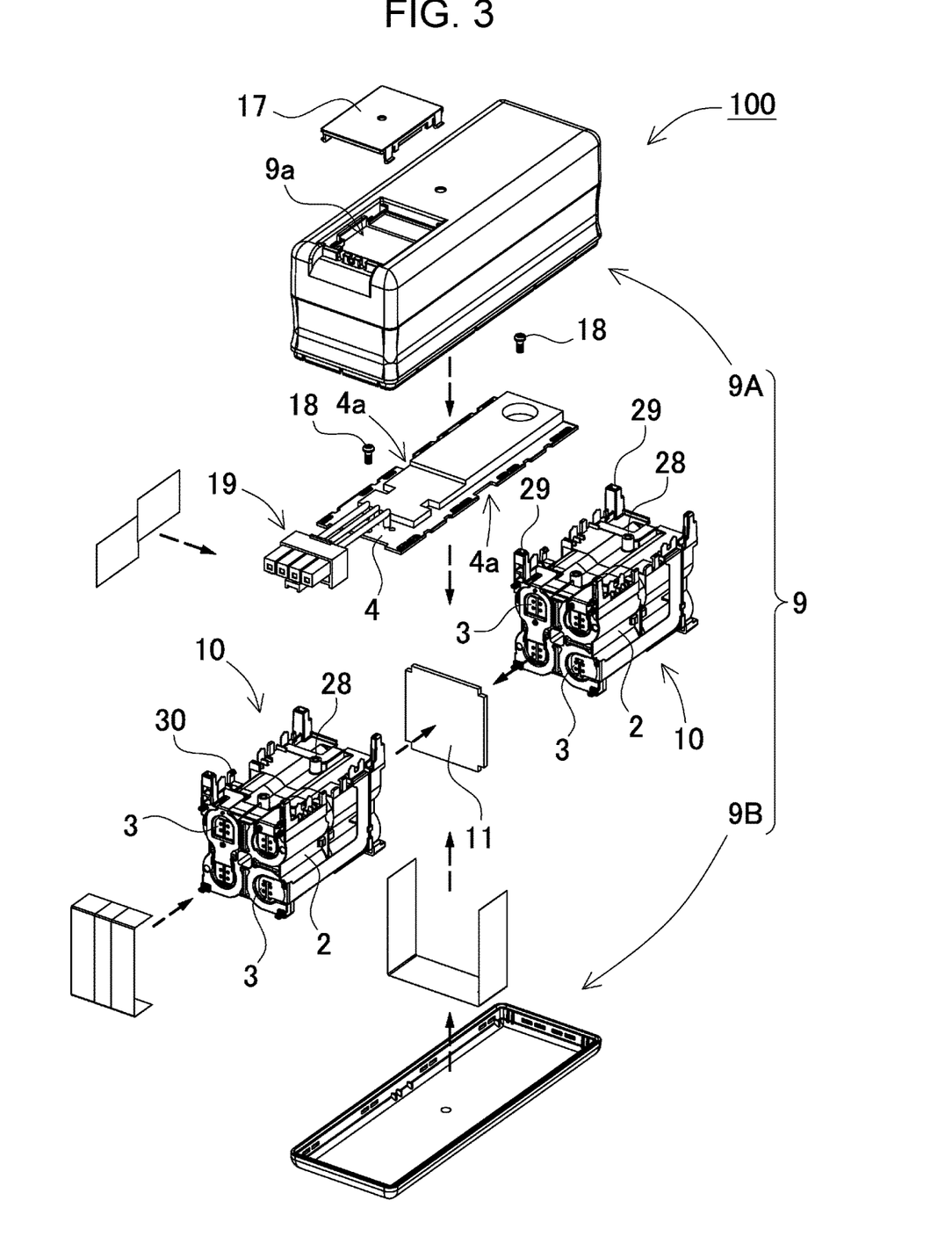
FIG. 3 is an exploded perspective view of the battery pack shown in FIG. 1.
Figure 4:
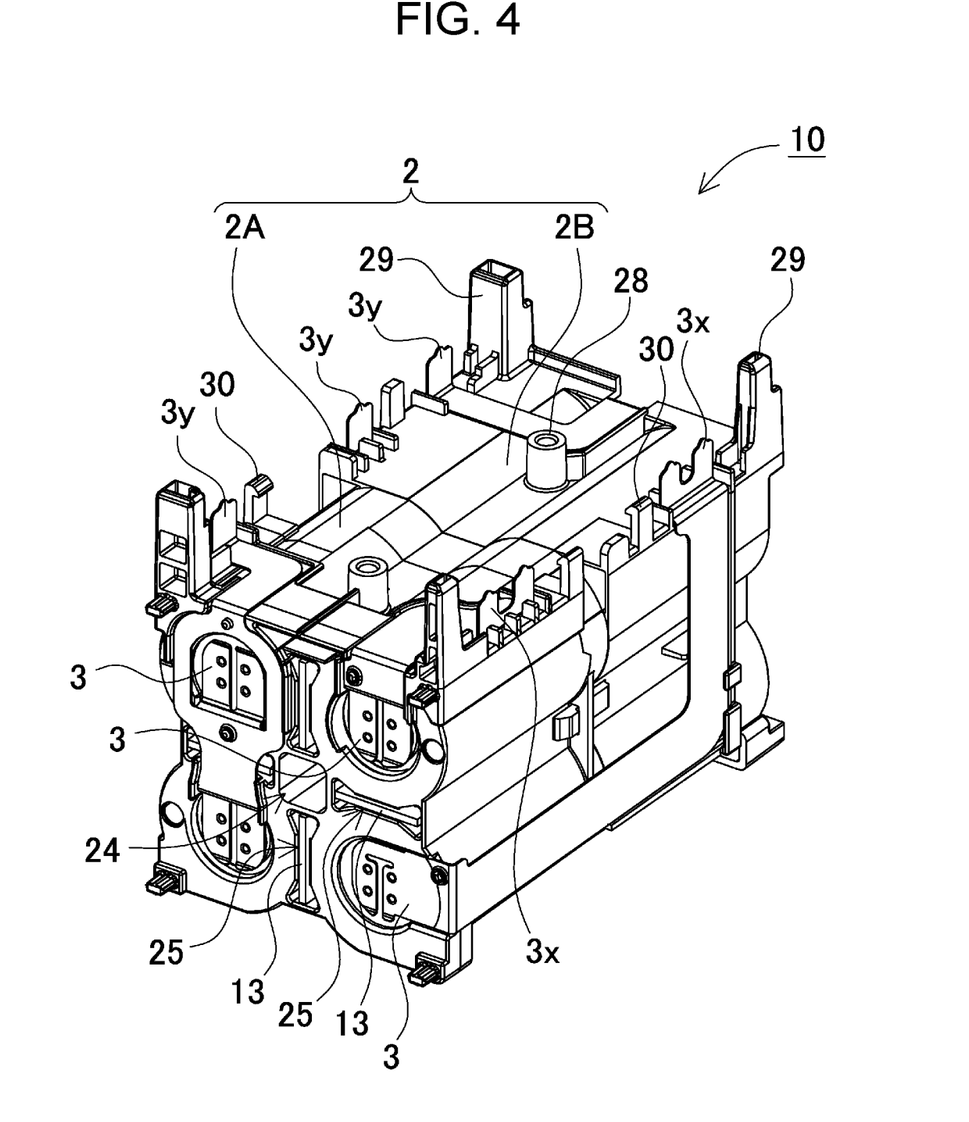
FIG. 4 is a perspective view of a battery block.
Figure 5:
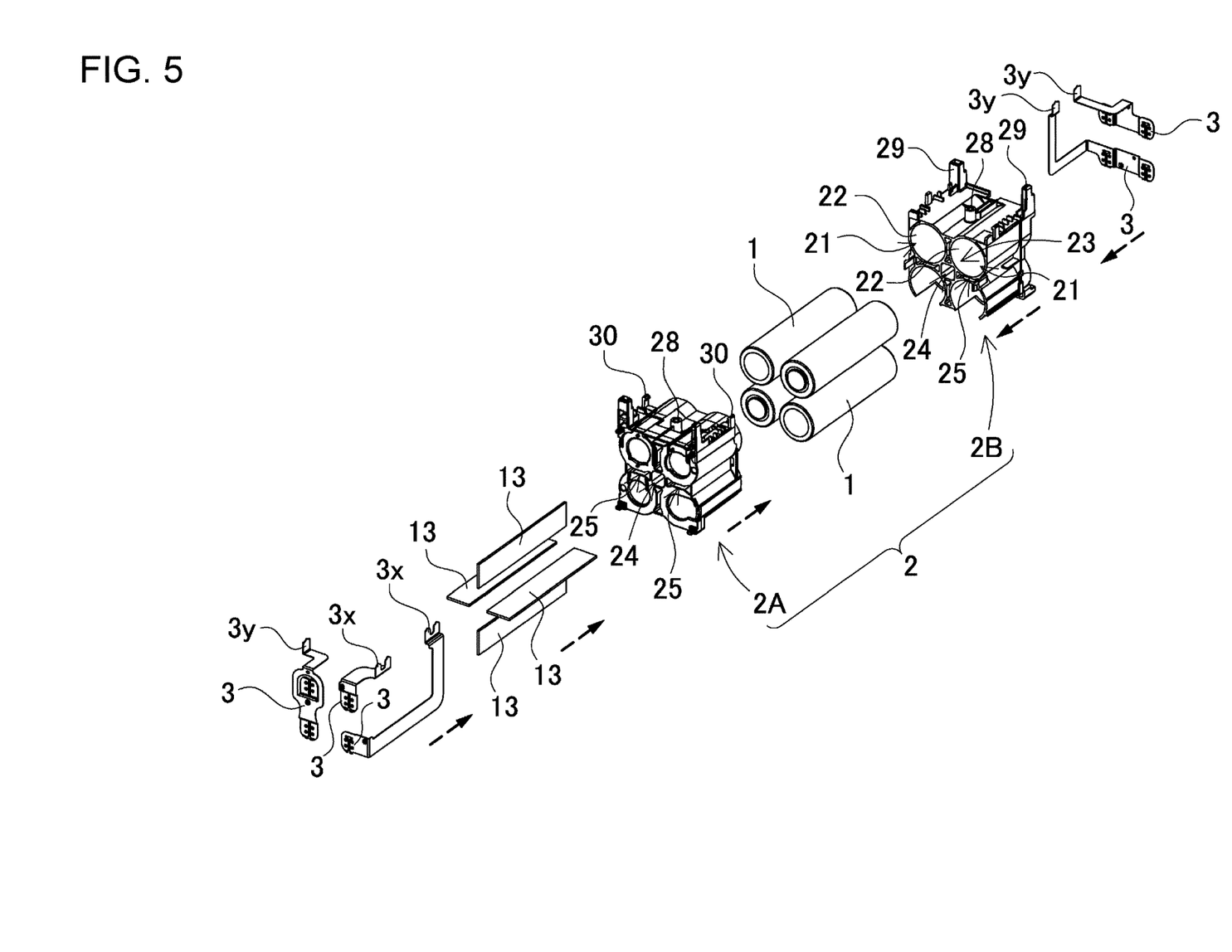
FIG. 5 is an exploded perspective view of the battery block shown in FIG. 4.
Figure 6:
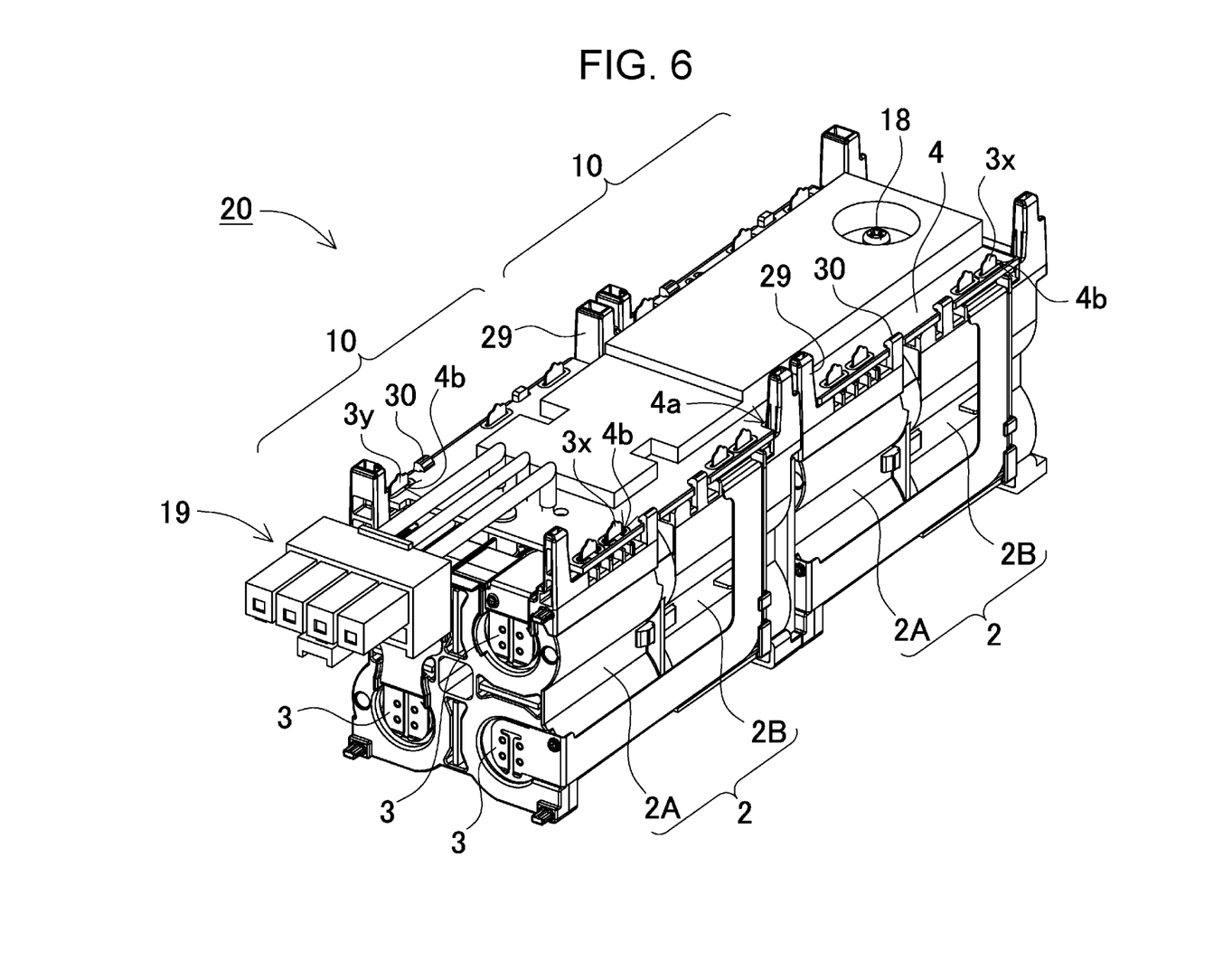
FIG. 6 is a perspective view of a core pack in which two battery blocks and a circuit board are coupled.

FIGS. 1 to 5 show a battery pack according to one exemplary embodiment of the present invention. FIG. 1 is a perspective view of the battery pack, FIG. 2 is a vertical cross-sectional view of the battery pack, and FIG. 3 is an exploded perspective view of the battery pack. FIG. 4 is a perspective view of a battery block built in the battery pack, FIG. 5 is an exploded perspective view of the battery block, and FIG. 6 is a perspective view of a battery core pack in which two battery blocks and a circuit board are coupled. Battery pack 100 shown in FIGS. 1 to 6 includes a plurality of battery cells 1 and holder 2 in which battery cells 1 are arranged in a parallel posture. Battery pack 100 shown in FIGS. 2 and 3 includes exterior case 9 that houses two sets of battery blocks 10 arranged in the longitudinal direction, and circuit board 4.

Battery pack 100 is used as a power source for a mobile device such as a vacuum cleaner. However, the present invention does not limit the use of the battery pack to a mobile device. The battery pack is also applicable to other mobile devices such as an electric tool and an assisted bicycle, for example. The battery pack shown in the drawings is structured to be detachably coupled to a portable device. However, the battery pack of the present invention can also be used by being incorporated in a portable device in a non-detachable state.

(Exterior Case 9)

Battery pack 100 is formed in a rectangular tubular box shape as shown in FIGS. 2 and 3. Exterior case 9 shown in the drawings is divided into two parts, case body 9A and closing part 9B. Exterior case 9 has connector 19 drawn to the outside for connecting with a portable device that is to be supplied power from battery pack 100. Exterior case 9 is made of a material having excellent electrical insulating properties and thermal insulating properties, for example, resin such as polycarbonate.

Inside exterior case 9 stores, as shown in FIG. 3, two sets of battery blocks 10, insulating plate part 11 disposed between battery blocks 10, and circuit board 4 connected to battery blocks 10. As shown in FIGS. 4 and 5, battery block 10 has a plurality of battery cells 1 arranged in parallel posture in holder 2. In illustrated battery block 10, four battery cells 1 are arranged in two rows and two stages in holder 2. Battery cell 1 uses a cylindrical battery having a cylindrical exterior can. In illustrated battery block 10, four battery cells 1 are arranged in two rows and two stages, and battery cells 1 are connected in series by lead plates 3. In illustrated battery block 10, four battery cells 1 are arranged in two rows and two stages and connected in series. However, a number and connection form of battery cells can be freely changed.

Battery cell 1 is a lithium ion secondary battery. However, battery cell 1 can be a non-aqueous electrolyte secondary battery other than a lithium-ion secondary battery. The cylindrical battery cell may be a rechargeable secondary battery such as a nickel metal hydride battery or a nickel cadmium battery, especially a battery that generates heat at high temperatures when being used.

Battery cells 1 are electrically connected in series by lead plates 3. Lead plate 3 is formed by bending a metal plate having excellent conductivity. Lead plate 3 is welded to an electrode on an end surface of battery cell 1. Lead plate 3 with battery cell 1 is connected to circuit board 4. Circuit board 4 has a charge/discharge circuit and a protection circuit mounted thereon. Circuit board 4 is connected to output lead part 3x for inputting positive or negative output of each battery block 10, or is connected to intermediate potential lead part 3y for measuring intermediate potential in order to detect a voltage of each battery cell 1. In addition, circuit board 4 may be connected to potential of a temperature detector (not illustrated) for detecting a temperature of each battery cell 1. The temperature detector can be a thermistor or the like.

(Insulation Plate Part 11)

As shown in FIG. 3, inside exterior case 9 has insulating plate part 11 disposed between battery blocks 10. Insulating plate part 11 is disposed between battery blocks 10 arranged side by side in the longitudinal direction of exterior case 9. Insulating plate part 11 is an inorganic plate made from a material having excellent insulating properties and heat insulating properties, for example, such as a mica plate.

(Battery Block 10)

Battery block 10 has four battery cells 1 arranged at fixed positions in plastic holder 2. Battery block 10 shown in FIGS. 4 and 5 has holder 2 divided into first holder 2A and second holder 2B in the longitudinal direction of battery cells 1. First holder 2A and second holder 2B are separately manufactured by molding plastic, and battery cells 1 are inserted and coupled to each other. First holder 2A and second holder 2B each have cylindrical holding part 21 for inserting cylindrical battery cells 1 and arranging the same at fixed positions. An inner shape of holding part 21 is substantially the same as an outer shape of battery cell 1, and to be exact, the inner shape of holding part 21 is slightly larger to smoothly insert and arrange battery cells 1 at fixed positions. First holder 2A and second holder 2B of this structure are coupled to each other at fixed positions with battery cells 1 therebetween in a state where both ends of cylindrical battery cells 1 are inserted. First holder 2A and second holder 2B can be more accurately coupled to each other with opposing surfaces as a fitting structure, and are also coupled together at fixed positions with a thermally insulating plate described later.

(Holder 2)

In order to arrange four battery cells 1 in a parallel posture, holder 2 shown in FIGS. 3 and 4 is molded into a shape in which four sets of holding tubes 22 are coupled in two rows and two stages in a parallel posture, and holding part 21 is formed such that an inside of each holding tube 22 is made substantially equal to the outer shape of battery cell 1. Holding tube 22 defines partition wall 23 between adjacent battery cells 1. In illustrated holder 2, since battery cells 1 are arranged in two rows and two stages, cross-shaped partition wall 23 is provided between the four sets of battery cells 1 arranged vertically and horizontally. Partition wall 23 has a three-layer structure of thermally insulating plate 13 and resin molded layers 12 in which resin molded layer 12 is provided on the surface facing battery cell 1 and thermally insulating plate 13 is disposed inside resin molded layer 12. Partition wall 23 has a three-layer structure in which resin molded layers 12 are laminated on both sides of internal thermally insulating plate 13. Resin molded layer 12 has a surface molded into a curved surface along a surface of cylindrical battery cell 1 to arrange battery cell 1 at a fixed position.

Holder 2 of FIGS. 4 and 5 has inflow spaces 24 and 27 for heat-melted holding tube 22 outside holding tube 22. In holder 2 of FIGS. 4 and 5, holding tubes 22 are arranged in multiple stages and multiple rows, in two rows and two stages in these drawings, cross-shaped partition wall 23 is provided between holding tubes 22 arranged vertically and horizontally, and inflow space 24 is provided in the center of cross-shaped partition wall 23. Inflow space 24 is provided in a hollow part of cross-shaped partition wall 23, as a rectangular hollow part extending in the longitudinal direction of battery cell 1. Inflow space 24 provided in this part has a large internal volume so that the heat-melted resin of holding tube 22 can smoothly flow into this space.

Holder 2 of FIG. 4 further has inflow spaces 27 provided on both sides of insertion gap 25 for disposing thermally insulating plate 13 at a fixed position. Inflow spaces 27 each are provided such that flat-surface parts facing each other are placed at portions of an outer surfaces of adjacent cylindrical holding tubes 22, holding gap 26 for thermally insulating plate 13 is provided between the facing flat-surface parts, and a lateral width of holding gap 26 is made narrower than a lateral width of thermally insulating plate 13, in other words, an entire width of insertion gap 25. Insertion gap 25 has inflow spaces 27 on both sides of holding gap 26 of thermally insulating plate 13. Holding gap 26 sandwiches thermally insulating plate 13 between both sides and holds at a fixed position. Inflow spaces 27 are on both sides of insertion gap 25 and allow the heat-melted resin of holding tube 22 to flow in.

Holder 2 described above has inflow spaces 24 and 27 into which the heat-melted synthetic resin of holding tube 22 is to flow at the both sides of insertion gap 25 and the hollow parts of cross-shaped partition wall 23. In this holder 2, when battery cell 1 generates abnormal heat and holding tube 22 is heat-melted, the heat-melted synthetic resin flows into inflow spaces 27 on the both sides of insertion gap 25. Melted synthetic resin flowing into these spaces melts the synthetic resin between inflow spaces 27 and inflow space 24 provided in the hollow part of the cross-shaped partition wall 23, and then flows into inflow space 24 provided in the hollow part of cross-shaped partition wall 23 as shown by arrows A. The heat-melted synthetic resin flows into inflow space 24 and is cooled. When the synthetic resin is heat-melted and flows into inflow space 24, an air layer is formed between battery cell 1 and thermally insulating plate 13, and a heat insulation effect of this air layer prevents induction of thermal runaway to adjacent battery cells 1. Since holder 2 of FIG. 2 also has inflow space 27 outside lower holding tubes 22, when any of battery cells 1 inside lower holding tubes 22 generates abnormal heat and holding tube 22 is heat-melted, the melted synthetic resin flows into inflow spaces 27 provided below holding tube 22 and is cooled. In addition, the air layer is provided between battery cell 1 and thermally insulating plate 13 to insulate the heat and prevent thermal runaway.

(Thermally Insulating Plate 13)

Thermally insulating plate 13 is a plate that does not deform at the temperature of battery cell 1 having generated abnormal heat, and preferably an inorganic plate such as a mica plate. As the inorganic plate, instead of the mica plate, one obtained by sintering or molding inorganic powder into a plate shape, or a plate-shaped inorganic material, or a plate-shaped inorganic fiber material can be used. As the thermally insulating plate, a plate material slightly thinner than the insertion gap is used such that it can be detachably disposed in the insertion gap.

Battery pack 100 described above is assembled in the following steps.

(1) Battery cells 1 and thermally insulating plates 13 are arranged and coupled at fixed positions in first holder 2A and second holder 2B. First holder 2A and second holder 2B are coupled in a state where battery cells 1 are inserted into corresponding holding parts 21 and thermally insulating plates 13 are inserted into corresponding insertion gaps 25 of partition wall 23. First holder 2A and second holder 2B are coupled by a locking structure, and are also coupled at fixed positions via built-in battery cells 1 and thermally insulating plates 13.

(2) Lead plates 3 are connected to end surface electrodes of battery cells 1 exposed from both end surfaces of holder 2 so that all battery cells 1 housed in holder 2 are connected in series. Lead plates 3 are electrically connected and fixed by welding to the end surface electrodes of battery cells 1.

Battery block 10 is manufactured through the above steps.

(3) Two battery blocks 10 are coupled with insulating plate part 11 sandwiched therebetween. Two battery blocks 10 are arranged side by side in the axial direction of battery cells 1, and are insulated by insulating plate part 11 interposed therebetween.

(4) Circuit board 4 is coupled to two battery blocks 10. Holder 2 shown in FIGS. 3 to 6 includes projecting part 29 on an upper surface, and projecting part 29 is guided to concave part 4a provided on an outer peripheral edge of circuit board 4 to dispose circuit board 4 at a fixed position. Further, holder 2 shown in the diagrams includes locking hook 30 protruding from the upper surface, and this locking hook 30 is locked to circuit board 4 and is coupled at a fixed position by a locking structure. Circuit board 4 is fixed to holder 2 by screwing set screws 18 penetrating circuit board 4 into fixing bosses 28 provided on the upper surface of holder 2.

(5) Output lead parts 3*x* and intermediate potential lead parts 3*y* drawn from lead plates 3 are electrically coupled to circuit board 4 connected to battery block 10. Output lead parts 3*x* and intermediate potential lead parts 3*y* are disposed so as to project from an upper surface of battery block 10, are inserted into connection holes 4*b* provided in circuit board 4 and disposed at fixed positions, and are electrically connected and physically coupled to circuit board 4 by soldering.

In the above state, as shown in FIG. 6, battery core pack 20 in which circuit board 4 is coupled to two battery blocks 10 is manufactured.

(6) Battery core pack 20 is stored in exterior case 9. Circuit board 4 shown in the diagram is connected to output connector 19. Battery core pack 20 is stored in case body 9A of exterior case 9 such that connector 19 passes through open window 9*a* in case body 9A, and then case body 9A is closed with closure part 9B. Then, open window 9*a* of case body 9A is closed by closure lid 17.

INDUSTRIAL APPLICABILITY

The battery pack of the present invention is suitably used as a power source for portable devices such as vacuum cleaners, electric power tools, and assisted bicycles.

REFERENCE MARKS IN THE DRAWINGS

100 battery pack
1 battery cell
2 holder
2A first holder
2B second holder
3 lead plate
3*x* output lead part
3*y* intermediate potential lead part
4 circuit board
4*a* concave part
4*b* connection hole
9 exterior case
9A case body
9*a* open window
9B closing part
10 battery block
11 insulation plate part
12 resin molded layer
13 thermally insulating plate
17 closure lid
18 set screw
19 connector
20 core pack
21 holding part
22 holding tube
23 partition wall
24 inflow space
25 insertion gap
26 holding gap
27 inflow space
28 fixing boss
29 projecting part
30 locking hook

The invention claimed is:

1. A battery pack comprising:
a plurality of battery cells; and
a holder holding the plurality of battery cells to be arranged in a parallel posture, wherein the holder includes a partition wall between adjacent two of the plurality of battery cells to arrange the plurality of battery cells at fixed positions, the partition wall has a three-layer structure including:

resin molded layers each having a surface facing a corresponding battery cell of the each adjacent two of the plurality of battery cells, and each surface being shaped to arrange the corresponding battery cell at a fixed position thereof, and a thermally insulating plate is disposed inside and being sandwiched by the resin molded layers, the holder further includes a synthetic resin molding the resin molded layers to be integrated into a single piece, and the resin molded layers are configured to melt at an elevated temperature lower than a melting point of the thermally insulating plate, wherein the holder includes an inflow space into which an adjacent resin molded layer of the resin molded layers is configured to flow when the adjacent resin molded layer is melted upon reaching the elevated temperature.

2. The battery pack according to claim 1, wherein the plurality of battery cells are cylindrical batteries, the holder comprising plastic, the plastic having an insertion gap for disposing the thermally insulating plate at a fixed position between the resin molded layers, the plastic having the each surface facing the corresponding battery cell, the each surface being curved along a surface of the corresponding battery cell, and the thermally insulating plate is disposed in the insertion gap.

3. The battery pack according to claim 1, wherein the thermally insulating plate is an inorganic plate.

4. The battery pack according to claim 3, wherein the thermally insulating plate is a mica plate.

5. The battery pack according to claim 1, wherein the holder includes:

a plurality of holding tubes, each holding tube for storing a corresponding one of the plurality of battery cells inside, and the inflow space provided outside the plurality of holding tubes, the inflow space being a space into which an adjacent holding tube of the plurality of holding tubes flows when the adjacent holding tube is melted by heat.

6. The battery pack according to claim 5, wherein the plurality of holding tubes is arranged in multiple stages and multiple rows, the partition wall is a cross-shaped partition wall that has a vertical section and a horizontal section intersecting each other at a central portion of the cross-sectional partition wall, the vertical section defines an interface between horizontally adjacent holding tubes of the plurality of holding tubes, and the horizontal section defines an interface between vertically adjacent holding tubes of the plurality of holding tubes, and the inflow space includes a central inflow space being elongated along a length of the plurality of battery cells, and being located in the central portion of the cross-shaped partition wall.

7. The battery pack according to claim 5, wherein the holder includes an insertion gap having the inflow space in a section of the partition wall which defines an interface between adjacent holding tubes of the plurality of holding tubes, the insertion gap includes:

a holding gap for disposing the thermally insulating plate at a fixed position, the holding gap sandwiching a central portion of the thermally insulating plate, and the inflow space, and a lateral width of the holding gap is narrower than a lateral width of the thermally insulating plate, and the inflow space is provided on both side portions of the thermally insulating plate.

8. The battery pack according to claim 2, wherein the thermally insulating plate is disposed so as to be freely placed into and taken out of the insertion gap.

9. A battery pack comprising:

a plurality of battery cells; and a holder holding the plurality of battery cells to be arranged in a parallel posture, wherein the holder includes a partition wall between adjacent two of the plurality of battery cells to arrange the plurality of battery cells at fixed positions, the partition wall has a three-layer structure including:

resin molded layers each having a surface facing a corresponding battery cell of the each adjacent two of the plurality of battery cells, and each surface being shaped to arrange the corresponding battery cell at a fixed position thereof, and a thermally insulating plate is disposed inside and being sandwiched by the resin molded layers, the holder further includes a synthetic resin molding the resin molded layers to be integrated into a single piece, and the holder includes an inflow space into which an adjacent resin molded layer of the resin molded layers is configured to flow when the adjacent resin molded layer is melted, wherein the holder includes:

a plurality of holding tubes, each holding tube for storing a corresponding one of the plurality of battery cells inside, and the inflow space provided outside the plurality of holding tubes, the inflow space being a space into which an adjacent holding tube of the plurality of holding tubes flows when the adjacent holding tube is melted by heat, wherein the plurality of holding tubes is arranged in multiple stages and multiple rows, the partition wall is a cross-shaped partition wall that has a vertical section and a horizontal section intersecting each other at a central portion of the cross-sectional partition wall, the vertical section defines an interface between horizontally adjacent holding tubes of the plurality of holding tubes, and the horizontal section defines an interface between vertically adjacent holding tubes of the plurality of holding tubes, and the inflow space includes a central inflow space being elongated along a length of the plurality of battery cells, and being located in the central portion of the cross-shaped partition wall.

10. The battery pack according to claim 9, wherein the plurality of battery cells are cylindrical batteries, the holder comprising plastic, the plastic having an insertion gap for disposing the thermally insulating plate at a fixed position between the resin molded layers, the plastic having the each surface facing the corresponding battery cell, the each surface being curved along a surface of the corresponding battery cell, and the thermally insulating plate is disposed in the insertion gap.

11. The battery pack according to claim 9, wherein the thermally insulating plate is an inorganic plate.

12. The battery pack according to claim 11, wherein the thermally insulating plate is a mica plate.

13. The battery pack according to claim 10, wherein the thermally insulating plate is disposed so as to be freely placed into and taken out of the insertion gap.

14. A battery pack comprising:
a plurality of battery cells; and
a holder holding the plurality of battery cells to be arranged in a parallel posture, wherein the holder includes a partition wall between adjacent two of the plurality of battery cells to arrange the plurality of battery cells at fixed positions,
the partition wall has a three-layer structure including:
resin molded layers each having a surface facing a corresponding battery cell of the each adjacent two of the plurality of battery cells, and each surface being shaped to arrange the corresponding battery cell at a fixed position thereof, and
a thermally insulating plate is disposed inside and being sandwiched by the resin molded layers,
the holder further includes a synthetic resin molding the resin molded layers to be integrated into a single piece, and
the holder includes an inflow space into which an adjacent resin molded layer of the resin molded layers is configured to flow when the adjacent resin molded layer is melted,
wherein the holder includes:
a plurality of holding tubes, each holding tube for storing a corresponding one of the plurality of battery cells inside, and
the inflow space provided outside the plurality of holding tubes, the inflow space being a space into which an adjacent holding tube of the plurality of holding tubes flows when the adjacent holding tube is melted by heat, wherein
the holder includes an insertion gap having the inflow space in a section of the partition wall which defines an interface between adjacent holding tubes of the plurality of holding tubes,
the insertion gap includes:
a holding gap for disposing the thermally insulating plate at a fixed position, the holding gap sandwiching a central portion of the thermally insulating plate, and
the inflow space, and
a lateral width of the holding gap is narrower than a lateral width of the thermally insulating plate, and the inflow space is provided on both side portions of the thermally insulating plate.

15. The battery pack according to claim 14, wherein the plurality of battery cells are cylindrical batteries,
the holder comprising plastic,
the plastic having an insertion gap for disposing the thermally insulating plate at a fixed position between the resin molded layers,
the plastic having the each surface facing the corresponding battery cell, the each surface being curved along a surface of the corresponding battery cell, and
the thermally insulating plate is disposed in the insertion gap.

16. The battery pack according to claim 14, wherein the thermally insulating plate is an inorganic plate.

17. The battery pack according to claim 16, wherein the thermally insulating plate is a mica plate.

18. The battery pack according to claim 15, wherein the thermally insulating plate is disposed so as to be freely placed into and taken out of the insertion gap.

* * * * *